United States Patent [19]

Fukuma et al.

[11] Patent Number: 5,498,939
[45] Date of Patent: Mar. 12, 1996

[54] DEFLECTION YOKE AND CATHODE RAY TUBE HAVING THE SAME

[75] Inventors: Kooji Fukuma; Soichi Sakurai; Nobutaka Okuyama, all of Yokohama; Yoshio Satoh, Ichinomiyamachi; Yoshihiro Obara, Mizusawa, all of Japan

[73] Assignees: Hitachi, Ltd.; Hitachi Mizusawa Electronics Co., Ltd., both of Japan

[21] Appl. No.: 370,313

[22] Filed: Jan. 9, 1995

[30] Foreign Application Priority Data

Jan. 19, 1994 [JP] Japan .................................. 6-003861

[51] Int. Cl.⁶ ............................................. H01J 29/56
[52] U.S. Cl. ................................. 315/370; 315/368.19
[58] Field of Search ................................. 315/370, 371, 315/368.11, 368.19, 368.28

[56] References Cited

U.S. PATENT DOCUMENTS 3,906,303  5/1995  Gerritsen ............................. 315/370

FOREIGN PATENT DOCUMENTS 4-14984  1/1992  Japan .
6-223741  8/1994  Japan .

OTHER PUBLICATIONS

"Low Leakage Magnetic Field SS Deflection Yoke for 14" Color Display CRT," Technical Report of the Institute of Television Engineers of Japan, vol. 16, No. 2, Jan. 1992, IDY92–18, pp. 31–35.

Primary Examiner—Theodore M. Blum
Attorney, Agent, or Firm—Evenson, McKeown, Edwards & Lenahan

[57] ABSTRACT

A deflection yoke attached to a color cathode ray tube forming multiple electron beams arranged in line, and in particular a deflection yoke having convergence correction apparatus. Circuit components such as a plurality of resistors, variable resistors, and diodes are connected in parallel with vertical deflection coils. A part of a vertical deflection current flowing through the vertical deflection coils is diverted to the circuit components. Furthermore, the amount of the diverted current is made adjustable so that it will differ between a former part of a vertical deflection period and a latter part thereof. As a result, horizontal line misconvergence at upper and lower ends of the screen can be completely corrected.

4 Claims, 8 Drawing Sheets

DEFLECTION YOKE AND CATHODE RAY TUBE HAVING THE SAME

BACKGROUND OF THE INVENTION

The present invention relates to a deflection yoke attached to a color cathode ray tube forming multiple electron beams arranged in line, and in particular to a deflection yoke having convergence correction means.

A conventional deflection yoke having convergence correction means is described in "Low leakage magnetic field SS deflection yoke for 14" color dispaly CRT", Technical Report of The Institute of Television Engineers of Japan, Vol. 16, No. 2 (January 1992), IDY92-18, pp. 31–35, for example. In parallel with vertical deflection coils formed by two coils, resistors and a variable resistor are connected. Balance of a magnetic field generated by the vertical deflection coils formed by the two coils is changed by the variable resistor. Misconvergence of horizontal lines formed at upper and lower ends of a screen by electron beams located at opposite sides of multiple electron beams is corrected simultaneously in upper and lower parts of the screen.

FIG. 1 is a circuit diagram showing connection relations in such a conventional deflection yoke having convergence correction means. In FIG. 1, vertical deflection coils 4a and 4b formed by two coils are connected in series. Across the two vertical deflection coils, a series combination of resistors 10a and 10b and a variable resistor 11 is connected in parallel therewith. Furthermore, a variable terminal of the variable resistor 11 is connected to a junction between the vertical deflection coils 4a and 4b.

In the configuration heretofore described, an unbalance can be caused in vertical deflection currents flowing through the vertical deflection coils 4a and 4b by changing values of resistors respectively connected in parallel with the vertical deflection coils 4a and 4b by means of the variable resistors 11.

FIGS. 2A, 2B, 3A and 3B are sectional views showing sections of vertical deflection coils in the conventional deflection yoke illustrated in FIG. 1. In FIGS. 2A, 2B, 3A and 3B, numeral 13 denotes a vertical deflection magnetic field, 14a and 14b senses of vertical deflection currents, 15a and 15b senses of changes of vertical deflection currents, 16 a change of a vertical deflection magnetic field, 17B, 17G and 17R electron beams, and 18B and 18R deflection forces applied to the electron beams 17B and 17R.

FIG. 2A shows senses 14a and 14b respectively of vertical deflection currents let flow through the vertical deflection coils 4a and 4b when the electron beams 17B, 17G and 17R are deflected to the upper part of the screen. FIG. 2A also shows the vertical deflection magnetic field 13 generated at that time. In the same way, FIG. 2B shows senses 14a and 14b respectively of vertical deflection currents let flow when the electron beams 17B, 17G and 17R are deflected to the lower part of the screen. FIG. 2B also shows the vertical deflection magnetic field 13 generated at that time. In FIGS. 2A and 2B, it is assumed that the position of the variable terminal of the variable resitor 11 shown in FIG. 1 is at the middle point thereof.

On the other hand, FIGS. 3A and 3B show senses 15a and 15b of changes of vertical deflection currents and the change 16 of the vertical deflection magnetic field when the position of the variable terminal of the variable resistor 11 is moved from the states of FIGS. 2A and 2B toward the resistor 10a. That is to say, FIG. 3A shows them obtained when the electron beams 17B, 17G and 17R are deflected to the upper part of the screen, whereas FIG. 3B shows them obtained when the electron beams 17B, 17G and 17R are deflected to the lower part of the screen.

When the electron beams 17B, 17G and 17R are deflected to the upper part of the screen, all senses are reversed as compared with when the electron beams 17B, 17G and 17R are deflected to the lower part of the screen.

With reference to FIG. 1, the value of the resistor connected in parallel with the vertical deflection coil 4a is decreased by moving the position of the variable terminal of the variable resistor 11 toward the resistor 10a. Thereby, the amount of the vertical deflection current diverted to the resistor 10a is increased and the value of the current flowing through the vertical deflection coil 4a is decreased. As shown in FIG. 3A (or FIG. 3B), therefore, the sense 15a of the change of the vertical deflection current is opposite to the sense 14a of the vertical deflection current shown in FIG. 2A (or FIG. 2B).

On the other hand, the value of the resistor connected in parallel with the vertical deflection coil 4b is conversely increased. Thereby, the amount of the vertical deflection current diverted to the resistor 10b is decreased and the value of the current flowing through the vertical deflection coil 4b is increased. As shown in FIG. 3A (or FIG. 3B), therefore, the sense 15b of the change of the vertical deflection current is identical with the sense 14b of the vertical deflection current shown in FIG. 2A (or FIG. 2B).

Since the senses 15a and 15b of changes of vertical deflection currents are such senses, the change 16 of the vertical deflection magnetic field has four-pole magnetic field components as shown in FIG. 3A or 3B. As shown in FIG. 3A or 3B, therefore, deflection forces 18B and 18R are applied to the electron beams 17B and 17R located at opposite sides. Paying attention to the blue electron beam 17B, the deflection force 18B is applied to the blue electron beam 17B downward as shown in FIG. 3A when the electron beams 17B, 17G and 17R are deflected to the upper part of the screen. When the electron beams 17B, 17G and 17R are deflected to the lower part of the screen, the deflection force 18B is applied to the blue electron beam 17B upward as shown in FIG. 3B.

The case where the position of the variable terminal of the variable resistor 11 shown in FIG. 1 is moved toward the resistor 10a has heretofore been described. Moving the position of the variable terminal of the variable resistor 11 toward the resistor 10b causes movements wholly opposite to those in the foregoing description.

FIGS. 4A and 4B are diagrams illustrating changes of a convergence pattern on a phosphor screen 19. FIG. 4A shows the case where the position of the variable terminal of the variable resistor 11 shown in FIG. 1 is moved toward the resistor 10a. FIG. 4B shows the case where the position of the variable terminal of the variable resistor 11 is moved toward the resistor 10b.

It is now assumed that the position of the variable terminal of the variable resistor 11 is located at the middle point prior to movement and a blue horizontal line 20B coincides with a red horizontal line 20R on the phosphor screen 19 at that time. If the position of the variable terminal of the variable resistor 11 is moved toward the resistor 10a, the blue horizontal line 20B moves toward the inside of the screen as shown in FIG. 4A. If on the contrary the position of the variable terminal of the variable resistor 11 is moved toward the resistor 10b, the blue horizontal line moves toward the outside of the screen.

In the conventional deflection yoke shown in FIG. 1, horizontal line misconvergence at upper and lower ends of the screen is corrected simultaneously in the upper and lower parts of the screen by thus moving a blue horizontal line 20B relative to a red horizontal line 20R simultaneously toward the inside simultaneously in both upper and lower parts of the screen or toward the outside simultaneously in both upper and lower parts of the screen.

In the conventional deflection yoke having convergence correction means, horizontal line misconvergence at the upper and lower ends of the screen is corrected simultaneously in the upper and lower parts of the screen by moving a blue horizontal line relative to a red horizontal line toward the inside simultaneously in both upper and lower parts of the screen or toward the outside simultaneously in both upper and lower parts of the screen as described above.

It is now assumed that horizontal line misconvergence as shown in FIGS. 5A and 5B has occurred as horizontal line misconvergence caused at the upper and lower ends of the screen by the electron beams located at opposite sides. However, all the above described conventional deflection yoke can do is to move blue horizontal lines inside relative to red horizontal lines simultaneously in both upper and lower parts of the screen or outside simultaneously in both upper and lower ends of the screen. If it is attempted to correct the horizontal line misconvergence at one of the upper and lower ends of the screen, therefore, the horizontal line is significantly displaced into a direction opposite to the correction direction at the other of the upper and lower ends of the screen. The conventional deflection yoke has such a problem.

With reference to FIG. 5A, a blue horizontal line 20B located in the upper part is moved toward the outside of the screen in order to make the blue horizontal line 20B coincide with a red horizontal line 20R. In this case, blue horizontal lines 20B move toward the outside in both upper and lower parts of the screen. In the upper part of the screen, therefore, the blue horizontal line 20B can be made coincident with the red horizontal line 20R. However, the blue horizontal line 20B located in the lower part of the screen moves in a direction opposite to the direction of coincidence and becomes farther away from the red horizontal line 20R.

In case of horizontal line misconvergence as shown in FIGS. 5A and 5B, therefore, adjustments are made for the conventional deflection yoke in such a state that horizontal lines are deviated by nearly the same distance in the upper and lower parts of the screen. Thus, misconvergence cannot be completely corrected.

SUMMARY OF THE INVENTION

An object of the present invention is to provide a deflection yoke which can solve the above described problem of the conventional technique and which can completely correct horizontal line misconvergence at upper and lower ends of the screen as shown in FIGS. 5A and 5B.

In a deflection yoke according to the present invention, the above described object is achieved by connecting circuit components such as a plurality of resistors, variable resistors, and diodes in parallel with vertical deflection coils, diverting a part of a vertical deflection current flowing through the vertical deflection coils to the circuit components, and making the amount of the diverted current adjustable so that it will differ between a former part of a vertical deflection period and a latter part thereof.

Owing to the above described circuit configuration, an adjustment for horizontal line misconvergence can be made separately for the upper end of the screen and the lower end of the screen. As a result, adjustment precision of horizontal misconvergence can be improved and residual misconvergence can be decreased.

BRIEF DESCRIPTION OF THE DRAWINGS

Prior arts and preferred embodiments of the present invention will now be described in conjunction with the accompanying drawings, in which.

DESCRIPTION OF THE PREFERRED EMBODIMENTS

Embodiments of the present invention will hereafter be described by referring to drawings.

Figure 6:
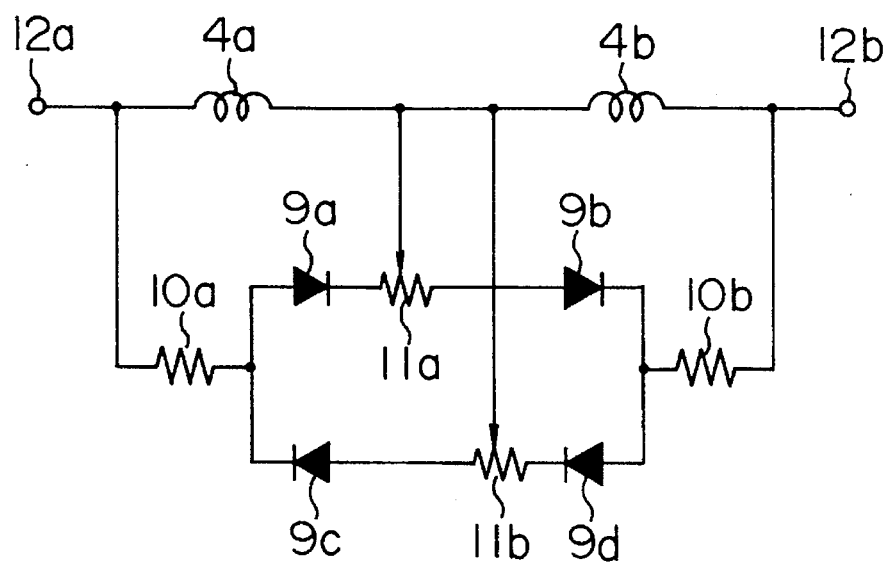
FIG. 6 is a circuit diagram showing connection relations in a deflection yoke according to a first embodiment of the present invention.
Figure 7:
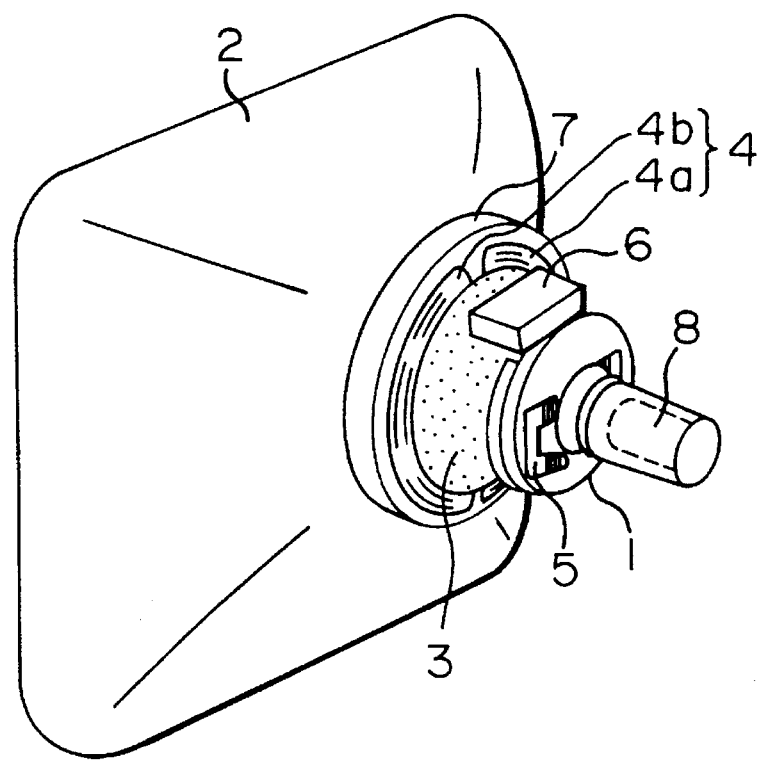
FIG. 7 is an oblique view showing an exterior view of a deflection yoke according to a first embodiment of the present invention.

FIG. 6 is a circuit diagram showing connection relations in a deflection yoke according to a first embodiment of the present invention. FIG. 7 is an oblique view showing an exterior view of the deflection yoke according to the first embodiment of the present invention.

First of all, description will be given by referring to FIG. 7. In FIG. 7, numeral 1 denotes a deflection yoke, 2 a color cathode ray tube, 3 a core, 4 vertical deflection coils, 5 a convergence yoke, 6 a terminal board cover, 7 a separator, and 8 an electron gun. The vertical deflection coils 4 in the deflection yoke 1 of the present embodiment take the shape of a saddle and are formed by two coils 4a and 4b. Furthermore, the core 3 is disposed on the periphery of the vertical deflection coils 4.

Figure 4A:
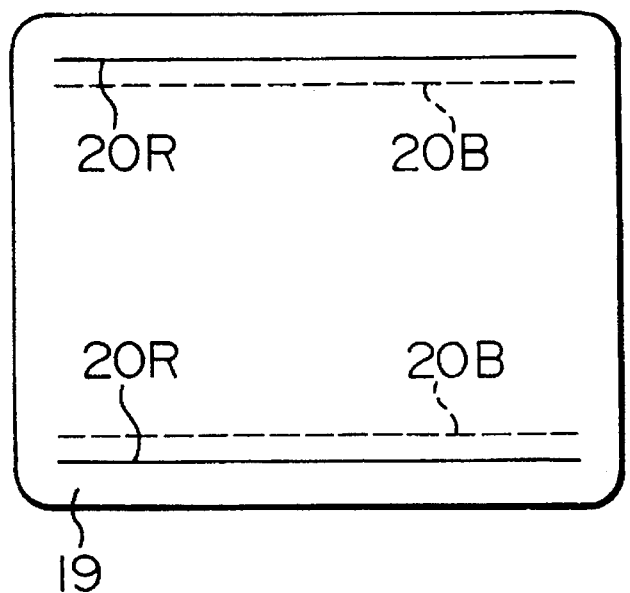
FIGS. 4A and 4B are diagrams illustrating changes of a convergence pattern on a phosphor screen when a conventional technique is used.
Figure 4B:
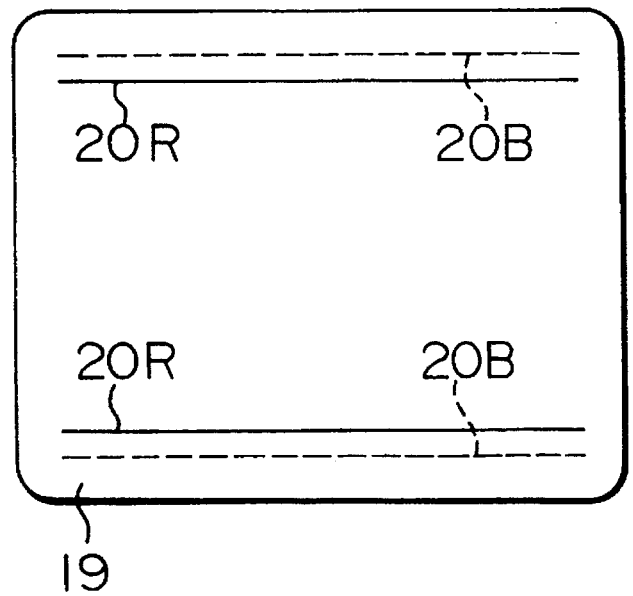

Then description will be given by referring to FIG. 6. In FIG. 6, 4a and 4b denote vertical deflection coils, 9a, 9b, 9c and 9d diodes, 10a and 10b resistors, 11a and 11b variable resistors, and 12a and 12b terminals.

In the present embodiment, the vertical deflection coils 4a and 4b formed by two coils are connected in series as shown in FIG. 6. Across the vertical deflection coils 4a and 4b, a circuit including the resistors 10a and 10b, variable resistors 11a and 11b, and diodes 9a, 9b, 9c and 9d is connected in parallel. In particular, the diodes 9a and 9b are respectively connected to opposite sides of the variable resistor 11a in series therewith so as to have the same polarity direction. The diodes 9c and 9d are respectively connected to opposite sides of the variable resistor 11b in series therewith so as to have polarity directions opposite to those of the diodes 9a and 9b. These series combinations are connected between the resistors 10a and 10b so as to become parallel with each other. Furthermore, variable terminals of the variable resistors 11a and 11b are connected to a junction between the vertical deflection coils 4a and 4b.

Assuming now in the configuration heretofore described that the vertical deflection current flows from the terminal 12a to the terminal 12b when electron beams are deflected to the upper part of the screen, the diodes 9a and 9b turn on and the diodes 9c and 9d turn off. When the electron beam is deflected to the upper part of the screen, therefore, an adjustment can be made by using the variable resistor 11a alone. On the contrary, when the electron beam is deflected to the lower part of the screen, the vertical deflection current flows from the terminal 12b to the terminal 12a and hence the diodes 9c and 9d turn on and the diodes 9a and 9b turn off. When the electron beam is deflected to the lower part of the screen, therefore, an adjustment can be made by using the variable resistor 11b alone.

Figure 8A:
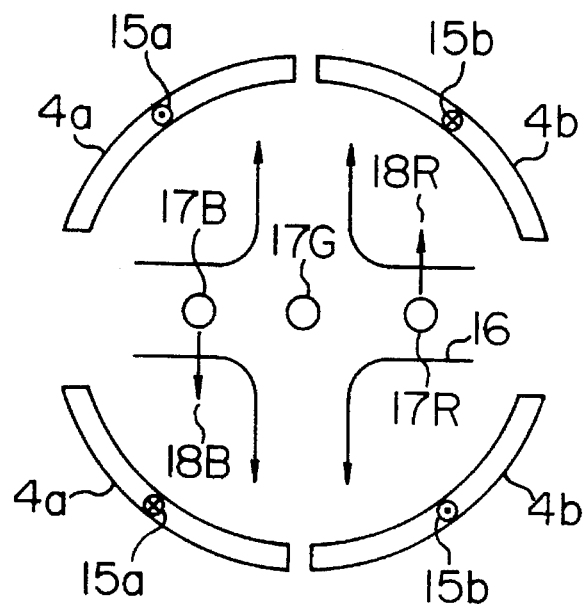
FIGS. 8A and 8B are sectional views showing sections of vertical deflection coils in the deflection yoke illustrated in FIG. 6.
Figure 8B:
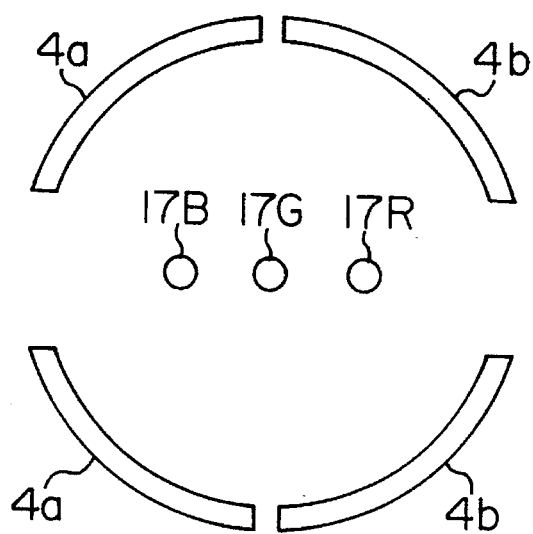

FIGS. 8A and 8B are sectional views showing sections of the vertical deflection coils in the deflection yoke illustrated in FIG. 6. In FIGS. 8A and 8B, 15a and 15b denote senses of changes of the vertical deflection current, 16 a change of a vertical deflection magnetic field, 17B, 17G and 17R electron beams, and 18B and 18R deflection forces applied to the electron beams 17B and 17R.

FIGS. 8A and 8B show senses 15a and 15b of changes of vertical deflection currents and the change 16 of the vertical deflection magnetic field when the position of the variable terminal of the variable resistor 11a illustrated in FIG. 6 is moved toward the resistor 10a. That is to say, FIG. 8A shows them obtained when the electron beams 17B, 17G and 17R are deflected to the upper part of the screen, whereas FIG. 8B shows them obtained when the electron beams 17B, 17G and 17R are deflected to the lower part of the screen. At this time, it is assumed that the position of the variable terminal of the variable resistor 11b illustrated in FIG. 6 is at the middle point thereof.

Figure 3A:
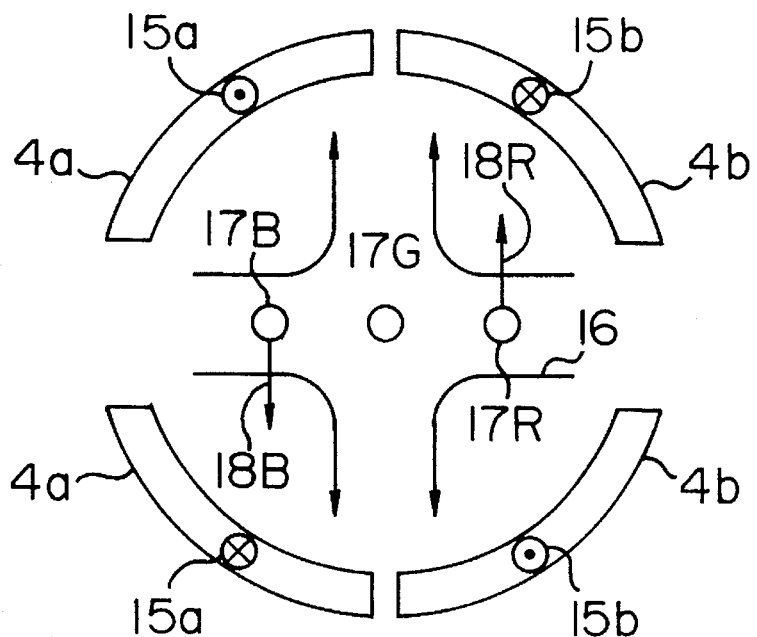
FIGS. 3A and 3B are sectional views showing sections of vertical deflection coils in a conventional deflection yoke illustrated in FIG. 1.
Figure 3B:
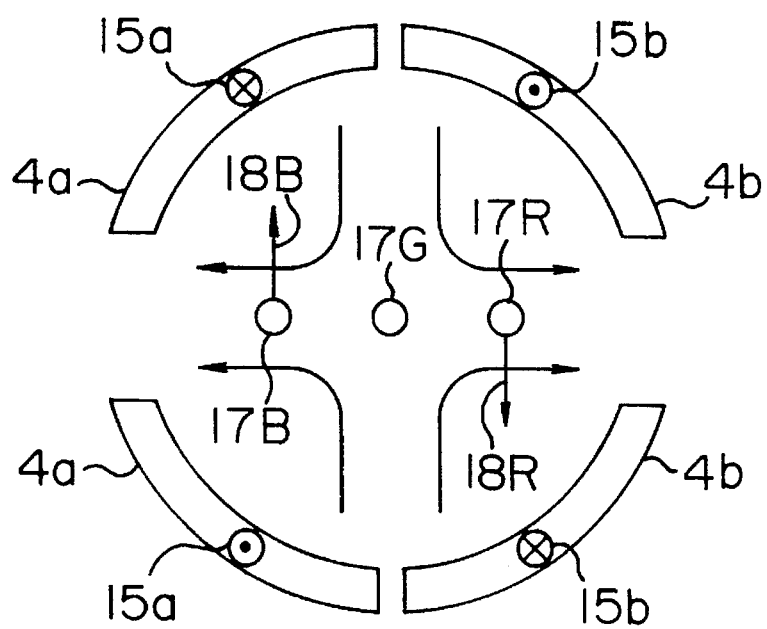

When the electron beams 17B, 17G and 17R are deflected to the upper part of the screen, the diodes 9a and 9b shown in FIG. 6 turn on and the diodes 9c and 9d turn off as described above and an adjustment can be made by using the variable resistor 11a alone. By moving the position of the variable terminal of the variable resistor 11a toward the resistor 10a, therefore, the value of the resistance connected in parallel with the vertical deflection coil 4a is decreased and the value of the resistance connected in parallel with the vertical deflection coil 4b is conversely increased. Thereby, the amount of the vertical deflection current diverted to the resistor 10a is increased and the value of the current flowing through the vertical deflection coil 4a is decreased. However, the amount of the vertical deflection current diverted to the resistor 10b is decreased and the value of the current flowing through the vertical deflection coil 4b is increased. In the same way as FIG. 3A, therefore, the senses 15a and 15b of changes of vertical deflection currents are senses as shown in FIG. 8A and the change 16 of the vertical deflection magnetic field has four-pole magnetic field components. As shown in FIG. 8A, therefore, deflection forces 18B and 18R are applied to the electron beams 17B and 17R located at opposite sides.

When the electron beams 17B, 17G and 17R are deflected to the lower part of the screen, the diodes 9c and 9d turn on and the diodes 9a and 9b turn off as described above and an adjustment can be made by using the variable resistor 11b alone. Since the position of the variable terminal of the variable resistor 11b remains at the middle point, however, there are no changes of the vertical deflection current as shown in FIG. 8B. Accordingly, changes 16 of the vertical deflection magnetic field are not present, either. As a result, deflection forces are not applied to the electron beams 17B and 17R.

If on the contrary the position of the variable terminal of the variable resistor 11b is moved toward the resistor 10a with the the position of the variable terminal of the variable resistor 11a fixed at the middle point thereof, deflection forces are not applied to the electron beams 17B and 17R when the electron beams 17B, 17G and 17R are deflected to the upper part of the screen and deflection forces 18B and 18R are applied to the electron beams 17B and 17R when the electron beams 17B, 17G and 17R are deflected to the lower part of the screen.

The case where the position of the variable terminal of the variable resistor 11a or 11b shown in FIG. 6 is moved toward the resistor 10a has heretofore been described. Moving the position of the variable terminal of the variable resistor 11a or 11b toward the resistor 10b causes movements wholly opposite to those in the foregoing description.

Figure 5A:
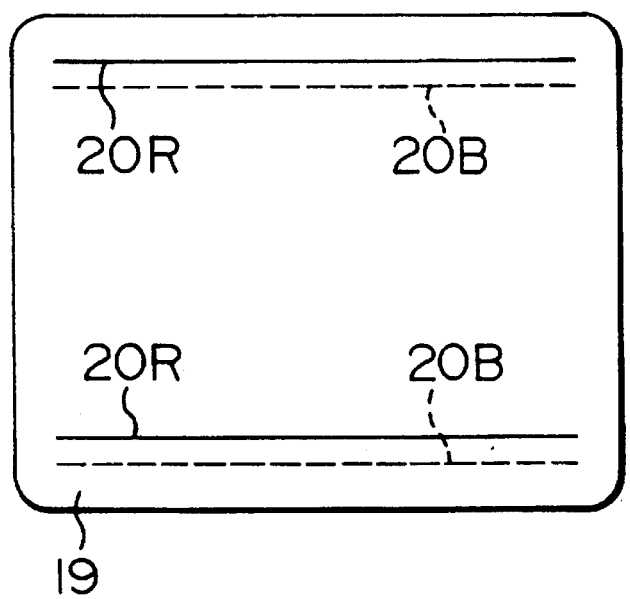
FIGS. 5A and 5B are diagrams illustrating residual misconvergence pattern on a phosphor screen when a conventional technique is used.
Figure 5B:
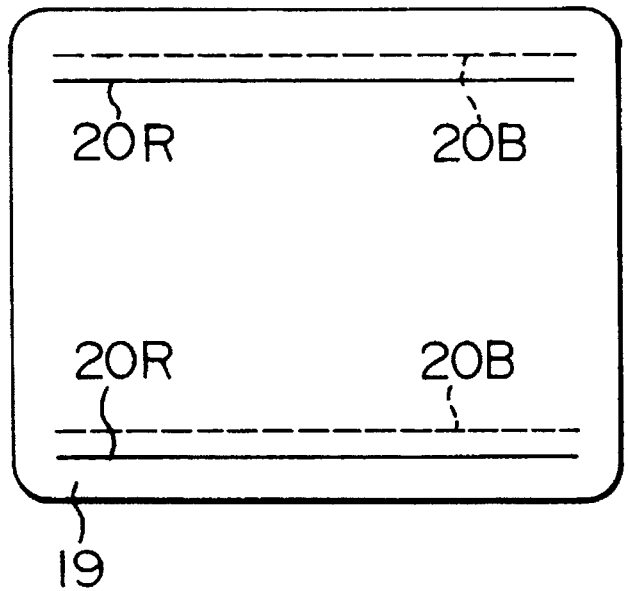

In the present embodiment, therefore, a blue horizontal line can be moved inside or outside of a red horizontal line separately in the upper part of the screen and the lower part of the screen. Independently in the upper part and lower part of the screen, horizontal line misconvergence can thus be corrected. As for horizontal line misconvergence caused at the upper and lower ends of the screen by electron beams located at opposite sides, therefore, not only the horizontal line misconvergence as shown in FIGS. 4A and 4B but also the horizontal line misconvergence as shown in FIGS. 5A and 5B can be completely corrected. Any horizontal line misconvergence pattern can thus be coped with.

Figure 1:
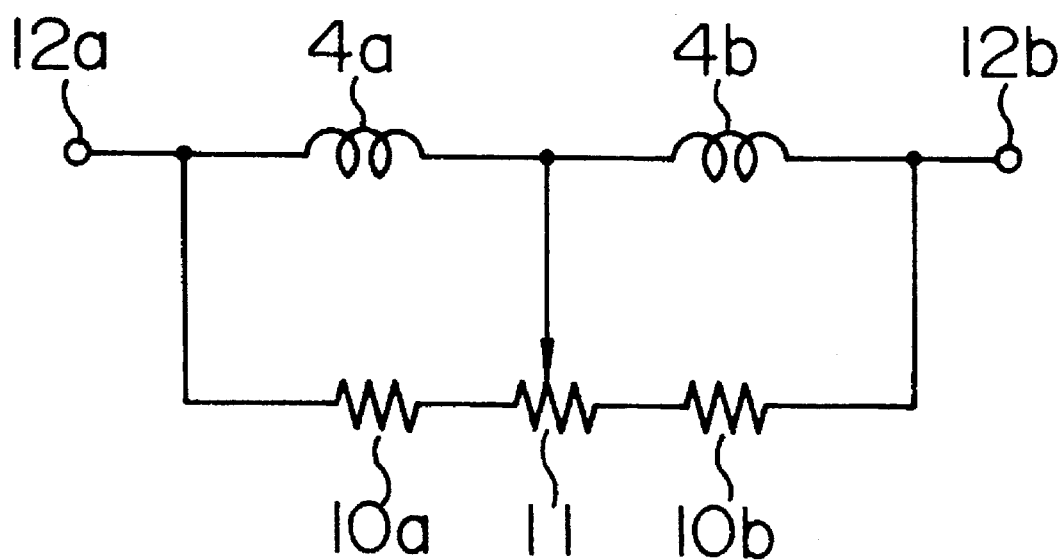
FIG. 1 is a circuit diagram showing connection relations in a conventional deflection yoke having convergence correction means.
Figure 2A:
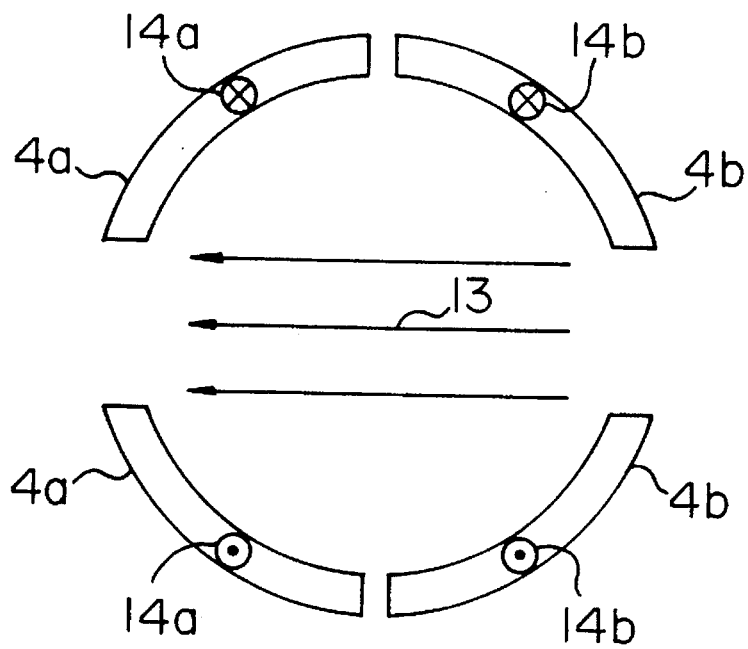
FIGS. 2A and 2B are sectional views showing sections of vertical deflection coils in a conventional deflection yoke illustrated in FIG. 1.
Figure 2B:
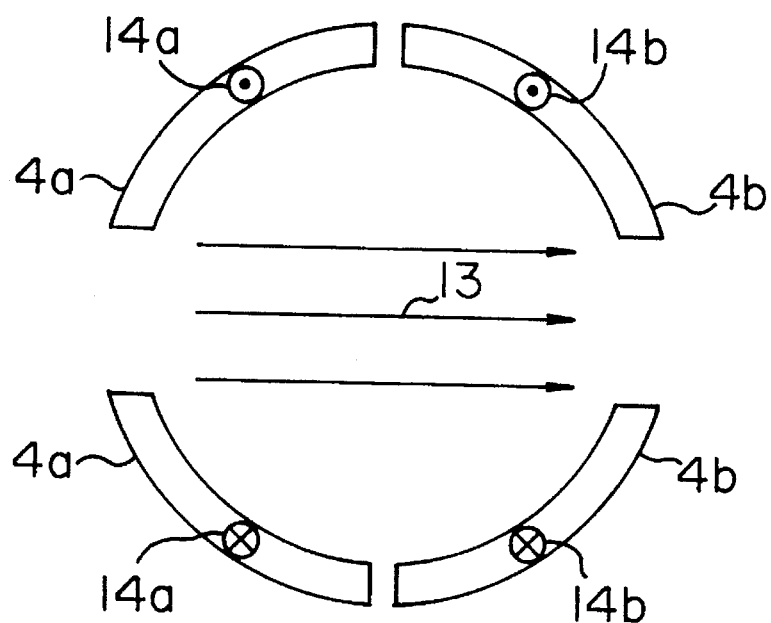
Figure 9:
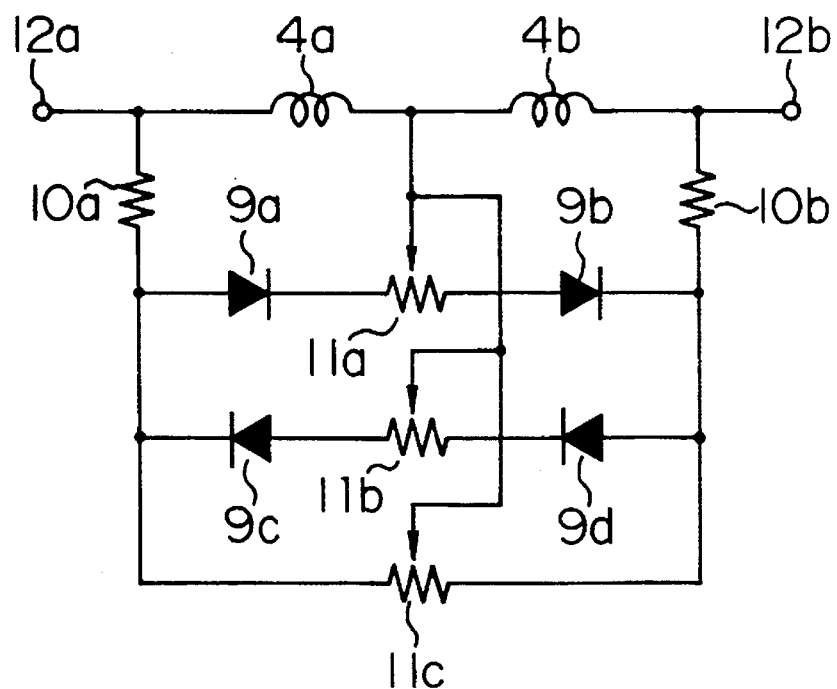
FIG. 9 is a circuit diagram showing connection relations in a deflection yoke according to a second embodiment of the present invention.

FIG. 9 is a circuit diagram showing connection relations in a deflection yoke according to a second embodiment of the present invention. In FIG. 9, components identical with those of FIG. 1 are denoted by like characters. In addition, 11c denotes a variable resistor.

In the present embodiment as shown in FIG. 9, the variable resistor 11c is added to the circuit configuration of FIG. 6 and is connected between the resistors 10a and 10b so as to be parallel with each of the series combination of the diodes 9a and 9b and the variable resistor 11a and the series combination of the diodes 9c and 9d and the variable resistor 11b. A variable terminal of the variable resistor 11c is connected to the junction between the vertical deflection coils 4a and 4b.

This variable resistor 11c functions in the same way as the variable resistor 11 in the conventional deflection yoke shown in FIG. 1. That is to say, a blue horizontal line is moved relative to a red horizontal line toward the inside simultaneously in both upper and lower parts of the screen or toward the outside simultaneously in both upper and lower parts of the screen by moving the position of the variable terminal of the variable resistor 11c. Thereby, horizontal line misconvergence as shown in FIGS. 4A and 4B can be corrected simultaneously in the upper and lower parts of the screen.

Among horizontal line misconvergence phenomena caused at the upper and lower ends of the screen by the electron beams located at opposite sides, horizontal line misconvergence as shown in FIGS. 4A and 4B occurs most frequently. In the present embodiment, therefore, horizontal line misconvergence as shown in FIGS. 4A and 4B is first corrected simultaneously in the upper and lower parts of the screen by using the variable resistor 11c and then the horizontal line misconvergence as shown in FIGS. 5A and 5B which cannot be completely corrected by the variable resistor 11c is corrected independently in the upper part and the lower part of the screen by using the variable resistors 11a and 11b. As compared with the first embodiment in which corrections are made by using only the variable resistors 11a and 11b, therefore, the present embodiment has an effect of reducing the working time.

Figure 10:
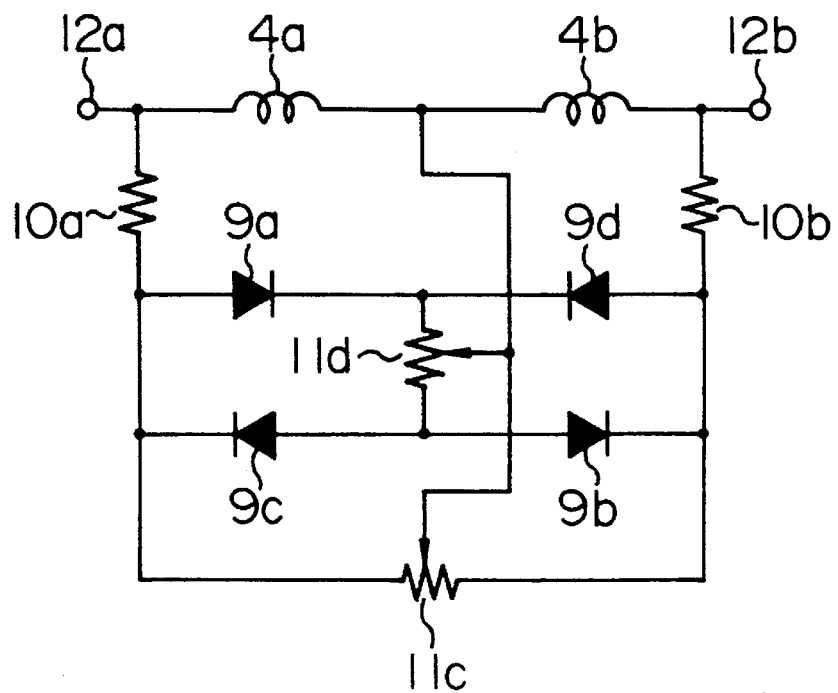
FIG. 10 is a circuit diagram showing connection relations in a deflection yoke according to a third embodiment of the present invention.

FIG. 10 is a circuit diagram showing connection relations in a deflection yoke according to a third embodiment of the present invention. In FIG. 10, components identical with those of FIG. 9 are denoted by like characters. In addition, 11d denotes a variable resistor.

In the present embodiment, a circuit including resistors 10a and 10b, variable resistors 11c and 11d, and diodes 9a, 9b, 9c and 9d is connected in parallel with and across vertical deflection coils 4a and 4b formed by two coils. In particular, diodes 9a and 9d are connected in series so as to have opposite polarity directions. Diodes 9c and 9b are connected in series so as to respectively have polarity directions respectively opposite to those of the diodes 9a and 9d. These series combinations and a varaible resistor 11c are connected between the resistors 10a and 10b so as to become parallel with each other. In addition, a variable resistor 11d is connected between the junction of the diodes 9a and 9d and the junction of the diodes 9c and 9b. Furthermore, variable terminals of both the variable resistors 11c and 11d are connected to the junction between the vertical deflection coils 4a and 4b.

Operation conducted in the configuration heretofore described when the position of the variable terminal of the variable resistor 11d is moved toward the diode 9a (9d) will now be described. When electron beams are deflected to the upper part of the screen, the vertical deflection current flows from the terminal 12a to the terminal 12b and the diodes 9a and 9b turn on whereas the diodes 9c and 9d turn off. By moving the position of the variable terminal of the variable resitor 11d toward the diode 9a (9d), therefore, the value of the current flowing through the vertical deflection coil 4a is decreased and the value of the current flowing through the vertical deflection coil 4b is conversely increased. As a result, senses 15a and 15b of changes of vertical deflection currents become senses as shown in FIG. 8A and the change 16 of the vertical deflection magnetic field has four-pole magnetic field components. As shown in FIG. 8A, therefore, deflection forces 18B and 18R are applied to the electron beams 17B and 17R located at opposite sides.

When electron beams are deflected to the lower part of the screen, the vertical deflection current flows from the terminal 12b to the terminal 12a. Therefore, the diodes 9c and 9d turn on whereas the diodes 9a and 9b turn off. By moving the position of the variable terminal of the variable resitor 11d toward the diode 9a (9d), therefore, the value of the current flowing through the vertical deflection coil 4a is increased and the value of the current flowing through the vertical deflection coil 4b is conversely decreased. As a result, senses 15a and 15b of changes of vertical deflection currents become senses as shown in FIG. 8A and the change 16 of the vertical deflection magnetic field has four-pole magnetic field components. As shown in FIG. 8A, therefore, deflection forces 18B and 18R are applied to the electron beams 17B and 17R located at opposite sides in the same way as when electron beams are deflected to the upper part of the screen.

The case where the position of the variable terminal of the variable resistor 11d shown in FIG. 10 is moved toward the diode 9a (9d) has heretofore been described. Moving the position of the variable terminal of the variable resistor 11d toward the diode 9c (9b) causes movements wholly opposite to those in the foregoing description.

In the present embodiment, therefore, a blue horizontal line can be moved upward relative to a red horizontal line simultaneously in both the upper and lower parts of the screen or downward simultaneously in both the upper and lower parts of the screen by moving the position of the variable terminal of the variable resistor 11d. Furthermore, in the same way as the second embodiment, a blue horizontal line can be moved inside relative to a red horizontal line simultaneously in both the upper and lower parts of the screen or outside simultaneously in both the upper and lower parts of the screen by moving the position of the variable terminal of the variable resistor 11c. Therefore, horizontal misconvergence as shown in FIGS. 4A and 4B can also be corrected simultaneously in both the upper and lower parts of the screen.

As heretofore described, the present invention makes it possible to completely correct not only the horizontal line misconvergence as shown in FIGS. 4A and 4B included in horizontal line misconvergence caused at upper and lower ends of the screen by the electron beams located at opposite sides but also the horizontal line misconvergence as shown in FIGS. 5A and 5B.

We claim:

1. A deflection yoke attached to a color cathode ray tube which forms multiple electron beams arranged in line, said deflection yoke comprising:

a first terminal;

a second terminal;

a pair of vertical deflection coils respectively disposed on a left side and a right side of said color cathode ray tube so as to sandwich said color cathode ray tube, said pair of vertical deflection coils being connected in series between said first terminal and said second terminal;

a first variable resistor having a variable terminal connected to a junction between said pair of vertical deflection coils;

a first diode connected between said first terminal and a first end of said first variable resistor;

a second diode connected between a second end of said first variable resistor and said second terminal, a series combination of said first diode, said first variable resistor and said second diode being connected between said first terminal and said second terminal so as to have a same polarity in said first diode and said second diode;

a second variable resistor having a variable terminal connected to the junction between said pair of vertical deflection coils;

a third diode connected between said first terminal and a first end of said second variable resistor;

a fourth diode connected between a second end of said second variable resistor and said second terminal, a series combination of said third diode, said second variable resistor and said fourth diode being connected between said first terminal and said second terminal so as to be parallel with said series combination of said first diode, said first variable resistor and said second diode and so as to have polarity directions opposite to those of said first and second diodes as polarity directions of said third and fourth diodes;

a first resistor having a first end connected to said first terminal and having a second end connected to a junction between said first diode and said third diode;

a second resistor having a first end connected to said second terminal and having a second end connected to a junction between said second diode and said fourth diode;

a third variable resistor having a variable terminal connected to the junction between said pair of vertical deflection coils, said third variable resistor being connected between said second end of said first resistor and said second end of said second resistor, in parallel with said series combination of said first diode, said first variable resistor and said second diode, and with said series combination of said third diode, said second variable resistor and said fourth diode; and a vertical deflection current being let flow from said first terminal to said second terminal in order to deflect said electron beams to an upper part of a screen and let flow from said second terminal to said first terminal in order to deflect said electron beams to a lower part of a screen.

2. A deflection yoke attached to a color cathode ray tube which forms multiple electron beams arranged in line, said deflection yoke comprising:

a first terminal;

a second terminal;

a pair of vertical deflection coils respectively disposed on a left side and a right side of said color cathode ray tube so as to sandwich said color cathode ray tube, said pair of vertical deflection coils being connected in series between said first terminal and said second terminal;

a first diode;

a second diode, said first diode and said second diode being connected in series so as to have opposite polarities, a series combination of said first diode and said second diode being connected between said first terminal and said second terminal;

a third diode;

a fourth diode, a series combination of said first diode and said fourth diode being connected between said first terminal and said second terminal so as to be parallel with said series combination of said first diode and said second diode, said third diode and said fourth diode respectively having polarities opposite to respective polarities of said first diode and said second diode;

a first variable resistor having a variable terminal connected to a junction between said pair of vertical deflection coils, said first variable resistor being connected between a junction of said first diode and said second diode and a junction of said third diode and said fourth diode;

a first resistor having a first end connected to said first terminal and having a second end connected to the junction between said first diode and said third diode;

a second resistor having a first end connected to said second terminal and having a second end connected to the junction between said second diode and said fourth diode;

a second variable resistor having a variable terminal connected to a junction between said pair of vertical deflection coils, said second variable resistor being connected between said second end of said first resistor and second end of said second resistor so as to be parallel with said series combination of said first diode and said second diode; and a vertical deflection current let flow from said first terminal to said second terminal in order to deflect said electron beams to an upper part of a screen and let flow from said second terminal to said first terminal in order to deflect said electron beams to a lower part of a screen.

3. A color cathode ray tube apparatus of the type having a color cathode ray tube for forming multiple electron beams arranged in line, and a deflection yoke attached to said color cathode ray tube, said deflection yoke comprising:

a first terminal;

a second terminal;

a pair of vertical deflection coils respectively disposed on a left side and a right side of said color cathode ray tube so as to sandwich said color cathode ray tube, said pair of vertical deflection coils being connected in series between said first terminal and said second terminal;

a first variable resistor having a variable terminal connected to a junction between said pair of vertical deflection coils;

a first diode connected between said first terminal and a first end of said first variable resistor;

a second diode connected between a second end of said first variable resistor and said second terminal, a series combination of said first diode, said first variable resistor and said second diode being connected between said first terminal and said second terminal so as to have a same polarity in said first diode and said second diode;

a second variable resistor having a variable terminal connected to the junction between said pair of vertical deflection coils;

a third diode connected between said first terminal and a first end of said second variable resistor;

a fourth diode connected between a second end of said second variable resistor and said second terminal, a series combination of said third diode, said second variable resistor and said fourth diode being connected between said first terminal and said second terminal so as to be parallel with said series combination of said first diode, said first variable resistor and said second diode and so as to have polarity directions opposite to those of said first and second diodes as polarity directions of said third and fourth diodes;

a first resistor having a first end connected to said first terminal and having a second end connected to a junction between said first diode and said third diode;

a second resistor having a first end connected to said second terminal and having a second end connected to a junction between said second diode and said fourth diode;

a third variable resistor having a variable terminal connected to the junction between said pair of vertical deflection coils, said third variable resistor being connected between said second end of said first resistor and said second end of said second resistor, in parallel with said series combination of said first diode, said first variable resistor and said second diode, and with said series combination of said third diode, said second variable resistor and said fourth diode; and a vertical deflection current being let flow from said first terminal to said second terminal in order to deflect said electron beams to an upper part of a screen and let flow from said second terminal to said first terminal in order to deflect said electron beams to a lower part of a screen.

4. A color cathode ray tube apparatus of the type having a color cathode ray tube for forming multiple electron beams arranged in line, and a deflection yoke attached to said color cathode ray tube, said deflection yoke comprising:

a first terminal;

a second terminal;

a pair of vertical deflection coils respectively disposed on a left side and a right side of said color cathode ray tube so as to sandwich said color cathode ray tube, said pair of vertical deflection coils being connected in series between said first terminal and said second terminal;

a first diode;

a second diode, said first diode and said second diode being connected in series so as to have opposite polarities, a series combination of said first diode and said second diode being connected between said first terminal and said second terminal;

a third diode;

a fourth diode, a series combination of said first diode and said fourth diode being connected between said first terminal and said second terminal so as to be parallel with said series combination of said first diode and said second diode, said third diode and said fourth diode respectively having polarities opposite to respective polarities of said first diode and said second diode;

a first variable resistor having a variable terminal connected to a junction between said pair of vertical deflection coils, said first variable resistor being connected between a junction of said first diode and said second diode and a junction of said third diode and said fourth diode;

a first resistor having a first end connected to said first terminal and having a second end connected to the junction between said first diode and said third diode;

a second resistor having a first end connected to said second terminal and having a second end connected to the junction between said second diode and said fourth diode;

a second variable resistor having a variable terminal connected to a junction between said pair of vertical deflection coils, said second variable resistor being connected between said second end of said first resistor and second end of said second resistor so as to be parallel with said series combination of said first diode and said second diode; and a vertical deflection current let flow from said first terminal to said second terminal in order to deflect said electron beams to an upper part of a screen and let flow from said second terminal to said first terminal in order to deflect said electron beams to a lower part of a screen.

* * * * *

UNITED STATES PATENT AND TRADEMARK OFFICE
CERTIFICATE OF CORRECTION

PATENT NO. : 5,498,939
DATED : March 12, 1996
INVENTOR(S) : Kooji Fukuma et al.

It is certified that error appears in the above-identified patent and that said Letters Patent is hereby corrected as shown below:

Claim 2, column 9,
Line 51, change "said first diode" to -- said third diode --.

Claim 4, column 11,
Line 32, change "said first diode" to -- said third diode --.

Signed and Sealed this

Twenty-eighth Day of August, 2001

*Attest:*

*Attesting Officer*

NICHOLAS P. GODICI
*Acting Director of the United States Patent and Trademark Office*